United States Patent [19]
Sahni et al.

[11] Patent Number: 5,646,986
[45] Date of Patent: Jul. 8, 1997

[54] NETWORK COMMUNICATION SYSTEM WITH GLOBAL EVENT CALENDAR INFORMATION AND TRUNK ALLOCATION

[75] Inventors: Paramdeep Singh Sahni, Marlboro; Andrew A. Soong, Colts Neck, both of N.J.

[73] Assignee: AT&T, Middletown, N.J.

[21] Appl. No.: 586,009

[22] Filed: Dec. 29, 1995

[51] Int. Cl.$^6$ .................................................. H04M 7/00
[52] U.S. Cl. ........................ 379/220; 379/207; 379/246
[58] Field of Search ............................... 379/220, 221, 379/219, 207, 229, 224, 230, 240, 246, 265, 137, 142

[56] References Cited

U.S. PATENT DOCUMENTS

| | | | |
|---|---|---|---|
| 5,214,688 | 5/1993 | Szlam | 379/137 |
| 5,287,498 | 2/1994 | Perelman et al. | 379/220 |
| 5,311,585 | 5/1994 | Armstrong et al. | 379/220 |
| 5,351,237 | 9/1994 | Shinohara et al. | 379/220 |
| 5,406,620 | 4/1995 | Pei | 379/220 |
| 5,463,685 | 10/1995 | Gaechter et al. | 379/219 |
| 5,463,686 | 10/1995 | Lebourges | 379/220 |

*Primary Examiner*—Ahmad F. Matar
*Assistant Examiner*—Thomas F. Presson
*Attorney, Agent, or Firm*—Robert B. Levy

[57] ABSTRACT

In a network-based communication system, communication trunks are allocated based on a history of network use and global event calendar information relating to particular regions that the network system services. A trunk allocation database is used for controlling the normal day-to-day trunk allocations to assign the trunks among the various network services. A global event calendar database containing holiday and event information observed by various countries and regions is provided for dynamically re-allocating the trunk assignments for trunks servicing a particular country or region when a holiday or event for that particular region occurs. The global event calendar database also informationally provides network users calling a particular region with timely information pertaining to holidays or events in the particular country or region that the user has called.

11 Claims, 4 Drawing Sheets

FIG. 2A

| TIME | PERIOD | BUSINESS SERVICE ||||||| PRIVATE SERVICE |||||||
| --- | --- | --- | --- | --- | --- | --- | --- | --- | --- | --- | --- | --- | --- | --- | --- |
| | | MON | TUE | WED | THU | FRI | SAT | SUN | MON | TUE | WED | THU | FRI | SAT | SUN |
| 1 | 0-2 | 10 | 10 | 10 | 10 | 10 | 10 | 10 | 500 | 500 | 500 | 500 | 500 | 500 | 500 |
| 2 | 2-4 | 10 | 10 | 10 | 10 | 10 | 10 | 10 | 500 | 500 | 500 | 500 | 500 | 500 | 500 |
| 3 | 4-6 | 500 | 500 | 500 | 500 | 500 | 10 | 10 | 10 | 10 | 10 | 10 | 10 | 500 | 500 |
| 4 | 6-8 | 500 | 500 | 500 | 500 | 500 | 10 | 10 | 10 | 10 | 10 | 10 | 10 | 500 | 500 |
| 5 | 8-10 | 500 | 500 | 500 | 500 | 500 | 10 | 10 | 10 | 10 | 10 | 10 | 10 | 500 | 500 |
| 6 | 10-12 | 500 | 500 | 500 | 500 | 500 | 10 | 10 | 10 | 10 | 10 | 10 | 10 | 500 | 500 |
| 7 | 12-14 | 500 | 500 | 500 | 500 | 500 | 10 | 10 | 10 | 10 | 10 | 10 | 10 | 500 | 500 |
| 8 | 14-16 | 500 | 500 | 500 | 500 | 500 | 10 | 10 | 10 | 10 | 10 | 10 | 10 | 500 | 500 |
| 9 | 16-18 | 500 | 500 | 500 | 500 | 500 | 10 | 10 | 10 | 10 | 10 | 10 | 10 | 500 | 500 |
| 10 | 18-20 | 10 | 10 | 10 | 10 | 10 | 10 | 10 | 500 | 500 | 500 | 500 | 500 | 500 | 500 |
| 11 | 20-22 | 10 | 10 | 10 | 10 | 10 | 10 | 10 | 500 | 500 | 500 | 500 | 500 | 500 | 500 |
| 12 | 22-24 | 10 | 10 | 10 | 10 | 10 | 10 | 10 | 500 | 500 | 500 | 500 | 500 | 500 | 500 |

FIG. 2B

| TIME | PERIOD | BUSINESS SERVICE | | | | | | | PRIVATE SERVICE | | | | | | |
|---|---|---|---|---|---|---|---|---|---|---|---|---|---|---|---|
| | | MON | TUE | WED | THU | FRI | SAT | SUN | MON | TUE | WED | THU | FRI | SAT | SUN |
| 1 | 0-2 | 10 | 10 | 10 | 10 | 10 | 10 | 10 | 500 | 500 | 500 | 500 | 500 | 500 | 500 |
| 2 | 2-4 | 10 | 10 | 10 | 10 | 10 | 10 | 10 | 500 | 500 | 500 | 500 | 500 | 500 | 500 |
| 3 | 4-6 | 10 | 10 | 10 | 10 | 10 | 10 | 10 | 500 | 500 | 500 | 500 | 500 | 500 | 500 |
| 4 | 6-8 | 10 | 10 | 10 | 10 | 10 | 10 | 10 | 500 | 500 | 500 | 500 | 500 | 500 | 500 |
| 5 | 8-10 | 10 | 10 | 10 | 10 | 10 | 10 | 10 | 500 | 500 | 500 | 500 | 500 | 500 | 500 |
| 6 | 10-12 | 10 | 10 | 10 | 10 | 10 | 10 | 10 | 500 | 500 | 500 | 500 | 500 | 500 | 500 |
| 7 | 12-14 | 10 | 10 | 10 | 10 | 10 | 10 | 10 | 500 | 500 | 500 | 500 | 500 | 500 | 500 |
| 8 | 14-16 | 10 | 10 | 10 | 10 | 10 | 10 | 10 | 500 | 500 | 500 | 500 | 500 | 500 | 500 |
| 9 | 16-18 | 10 | 10 | 10 | 10 | 10 | 10 | 10 | 500 | 500 | 500 | 500 | 500 | 500 | 500 |
| 10 | 18-20 | 10 | 10 | 10 | 10 | 10 | 10 | 10 | 500 | 500 | 500 | 500 | 500 | 500 | 500 |
| 11 | 20-22 | 10 | 10 | 10 | 10 | 10 | 10 | 10 | 500 | 500 | 500 | 500 | 500 | 500 | 500 |
| 12 | 22-24 | 10 | 10 | 10 | 10 | 10 | 10 | 10 | 500 | 500 | 500 | 500 | 500 | 500 | 500 |

FIG. 3

GLOBAL EVENT CALENDAR

| COUNTRY | COUNTRY CODE | CITY CODE | HOLIDAY | DATE | DURATION | BUSINESS TRUNK REDUCTION |
|---|---|---|---|---|---|---|
| KUWAIT | 965 | — | RAMADAN | MARCH 6 | 30 DAYS | 98% |
| ISRAEL | 972 | 2 | ROSH HASHANA | SEPT. 12 | 2 DAYS | 70% |
| FRANCE | 33 | 7 | BASTILLE DAY | JULY 14 | 1 DAYS | 80% |
| CHINA | 86 | 21 | NEW YEAR | FEBRUARY 9 | 7 DAYS | 50% |
| .... | .... | .... | .... | .... | .... | .... |

NETWORK COMMUNICATION SYSTEM WITH GLOBAL EVENT CALENDAR INFORMATION AND TRUNK ALLOCATION

BACKGROUND OF THE INVENTION

I. Field of the Invention

This invention pertains to a network communication system providing efficient trunk allocation based on customer needs. More particularly, the present invention relates to a network communication system having international trunk allocation to a particular country based on that country's national and religious holidays, for improved rate of call completion. Most particularly, the present invention is directed to a network communication system having efficient international trunk allocation based on customer needs while providing users with information regarding holidays and/or events observed in the dialed countries.

II. Description of the Related Art

Present communication systems have a finite bandwidth or number of trunks through which calls can be connected, with each trunk representing a voice circuit or connection. The finite bandwidth is usually divided among a plurality of applications or services such, for example, as so-called 1-900 lines, business lines, private customer lines, etc. The volume of calls for these applications or services vary not only during the days of the week, i.e. as between weekdays and weekends, but also during the hours of each day. For example, during an average work week, the volume of calls from private customer phone lines will be greatest on Monday through Friday during non-business hours and on weekends. On the other hand, the volume of calls from business phone lines will be greatest during traditional business hours and will decrease at other times, such as weekends and weeknights.

Existing long-distance or international communication systems account for the change or shift in user traffic by allocating available trunks according to a schedule that is based on the day of the week and the time of day. Such an allocation schedule is typically stored in a database compiled over a duration of time which pre-dates the current date, i.e the date when the particular international call is made. For example, and with regard to private customer and business uses, the database will store all traffic information for a two-week period and utilize this information to re-configure the existing trunks. Thus, if 510 total trunks are available and, based on the prior two-week history, 500 trunks are needed on Monday through Friday between the hours of 2 p.m. and 6 p.m. to accommodate calls from businesses, i.e. business calls, the database will convey this information to a signalling network or international switching station which will allocate the existing trunks so that 500 trunks are designated for business use whereas the remaining 10 trunks will be available for private customer use, i.e. calls from private phone lines. At 6 p.m., however, the database will, for example, notify the switching station of a further re-configuration based on the prior history stored in the database so as to decrease the number of business trunks and provide for additional private customer use trunks.

One drawback associated with existing communication systems which re-configure and re-allocate trunks between use types based on prior use history is that prior use history does not take into account or consideration irregularities or deviations in user demand that result from holidays or events which may occur on or during weekdays. The occurrence of a holiday in a particular country during the work week results in a reduced volume of business calls to and from that particular country because at least most businesses in that country are, in all likelihood, closed. At the same time, a rise in the volume of private customer calls to the particular country may occur as customers choose to call foreign relatives on the specific holiday. The end result of a lack of re-allocation between commercial trunks and private customer trunks in the event a holiday which occurs on a weekday is that business trunks remain unused while numerous private calls will not be connected due to the unavailability of sufficient circuits to satisfy private customer demand.

Another drawback of existing communication systems is that there is no mechanism or technique employed or available to alert and inform business and private customers of the existence of a particular holiday in a specific country that is being dialed. Such information is useful in many instances. For example, if a United States user is calling a business in France on a French national holiday, the user may not be aware that the business is closed until, for example, a recorded message is replayed, i.e. until after the call is connected and the long distance charge is assessed against the user's account. If, on the other hand, the user is made aware of the holiday before the line is connected, the user can terminate the connection and call at a later date. In addition, circumstances may arise where a user would welcome or desire information about a particular country's holiday before the date of that holiday so that, for example, greetings and good wishes can be provided on the appropriate date during a subsequent telephone call.

SUMMARY OF THE INVENTION

Accordingly, it would be desirable for a network communication system to provide improved trunk allocation among various network services to accommodate deviations in network traffic to a particular region that exist when a holiday or event observed in the particular region occurs. It would also be desirable to have a network system that provides users with information pertaining to global events that affect a particular region that a user has called.

The present invention is directed to a method and apparatus for providing, in a communication network, improved trunk allocation to accommodate shifts or deviations in user traffic among the various network services that occur or result when there occurs a particular holiday or event which affects a region or country. The inventive apparatus is a network communication system having improved trunk allocation for facilitating an increased call completion rate among a plurality of network customer services. The system includes a switching network having a plurality of trunks for accommodating network traffic. The trunks connect transactions between originating terminal devices having originating addresses and destination terminal devices having destination addresses sharing a common region. Each transaction is associated with one of the network customer services. A transaction database is provided which is connected to the switching network and which includes a memory for storing data representative of a history of transactions between the originating terminal devices and the destination terminal devices. The switching network utilizes the stored history, which is a representation of the network traffic carried by the switching network, to allocate the plurality of trunks for accommodating the transactions for the plurality of network customer services. A global event calendar database connected to the switching network and having memory for storing data parameters representative of events occurring on particular calendar dates and associated with the common region is provided. Means are also provided for accessing the global event calendar database and conveying the calendar representative data to the switching network when a particular calendar date corresponding to an event associated with the common region occurs, for re-configuring the trunk allocation for accommodating a change in network traffic through the switching network as a result of the occurrence of an event.

In the preferred embodiment, means are also included for accessing the global event calendar database when a particular region is called proximate, in time, the occurrence of an event associated with that region for providing a user with information regarding the event.

The inventive method provides improved trunk allocation or efficient trunk usage for network traffic connected through a switching network having a plurality of trunks associated with a specific global region, with each trunk assignable to one of a plurality of network customer services in a network communication system, to increase the rate of call completion. The method includes storing in a trunk allocation database a history of network traffic including a volume of calls, the network customer service associated with each call in the volume and the time and day of each call in the volume, assigning each trunk in the plurality of trunks to one of a plurality of network services based on the history of the network traffic and storing, in a global event calendar database, data parameters representative of events occurring on particular calendar days which affect the specific global region. The method further includes the step of allocating the plurality of trunks among the plurality of network customer services to accommodate a change in network traffic through the switching network as a result of the occurrence of one of the events.

In the preferred embodiment, the method further includes the steps of accessing the global event calendar database and providing a network user with at least some of the data parameters representative of one of the events when the network user calls the global region on a date proximate in time to the particular calendar day on when the event occurs.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 2A is a representation of a trunk allocation database without global calendar data;

FIG. 2B is a representation of a trunk allocation database taking into account global calendar data; and FIG. 3 is a representation of a global calendar database in accordance with the present invention.

DETAILED DESCRIPTION OF THE PRESENTLY PREFERRED EMBODIMENTS

Figure 1:
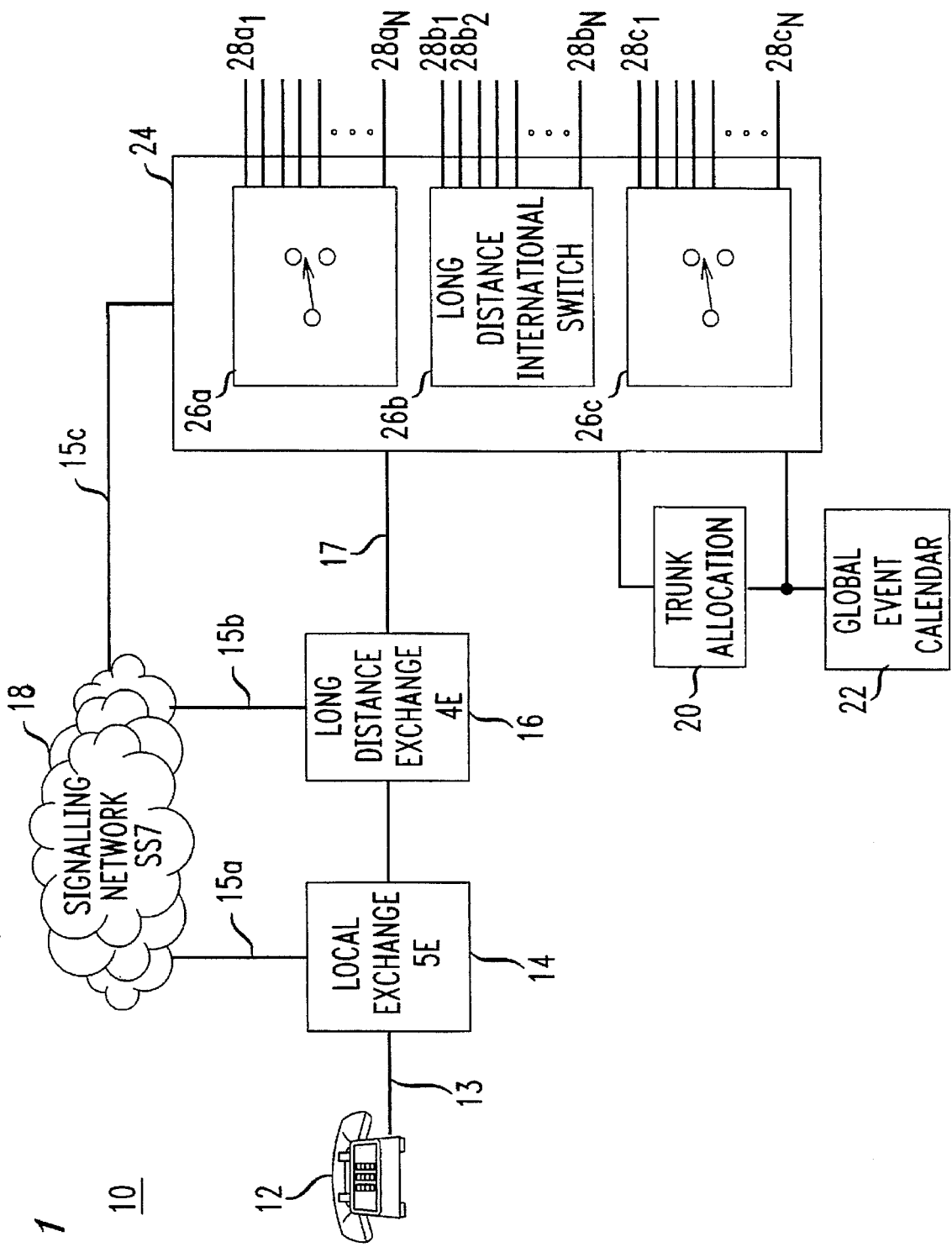
FIG. 1 is a block diagram of a system for providing improved trunk allocation in accordance with the present invention.

Referring now to the drawings, and initially to FIG. 1, a network communication system 10 in accordance with a preferred embodiment of the present invention is there depicted. As shown, the system 10 includes a terminal device 12, which may be a computer, telephone, facsimile machine, etc., which is connected to and communicatably interfaced with a local exchange carrier (LEC) 14 such as an AT&T 5E switching station through a standard or integrated services digital network (ISDN) line 13, as is well known to those of ordinary skill in the art. LEC 14 is, in turn, connected to a toll or long distance exchange (LEX) 16 such as an AT&T 4E switching network. A signalling network 18 such as an AT&T SS7, is connected to and controls LEC 14 and LEX 16 via control lines 15a and 15b, respectively.

Signalling network 18 is communicatably interfaced with an international switching station 24, via control line 15c, which contains a plurality of international switches 26 (three of which are depicted) corresponding to different countries. When network 18 sets up a call, the call data, e.g. voice, is provided to switching station 24 via a voice line trunk 17 connected between LEX 16 and switching station 24. Each international switch 26 controls a plurality of trunks 28 comprising a fixed bandwidth. For example, international switch 26a may be programmed to provide outgoing calls to France from the United States, which calls will be forwarded through a fixed number of trunks $28a_1$–$28a_N$, wherein N represents the total number of trunks for a particular switch. Likewise, international switch 26b may be programmed to provide outgoing calls to Kuwait and Saudi Arabia which will be forwarded through a fixed number of trunks associated with switch 26b.

As explained above, to achieve an efficient rate of call completion trunk allocation among various consumer services for each country is altered and adjusted based on data representing a prior history of consumer needs and activity which is stored in a trunk allocation database 20. For example, if international switch 26b interfaces signalling network 18 with Kuwait, trunks $28b_1$–$28b_N$ will provide connecting lines for all communication services between the United States and Kuwait. As will be appreciated, if the total number of trunks are allocated in equal proportion among, for example, business uses (i.e. from business phone lines) and personal uses (i.e. from personal phone lines), many attempted calls from businesses during business hours will not be connected because the customer demand for business calls will exceed the system's capacity which is based on the allocated amount of business trunks. The same situation will exist for personal uses occurring after business hours. To alleviate this problem, transaction allocation database 20 is provided with a past history of phone use to the particular country over a pre-set time period. For example, database 20 will contain telephone traffic history information for the two-week period immediately proceeding the present re-configuration time. The database information may conveniently be divided into 12 two-hour time segments representing the hours in each 24-hour day.

A representation of such a transaction allocation database 20 is depicted in FIG. 2A which, for simplicity sake, is divided among two services, namely business service and private consumer service. The trunk allocation database depicts, for a specific calendar week, the projected trunk allocation based on prior history. For example, and with respect to trunk allocation for international switch 26b which serves Kuwait and Saudi Arabia, FIG. 2A indicates that out of 510 total trunks, 10 trunks are available for business uses during the weekdays for time periods 1, 2, 11 and 12 corresponding to 8 p.m.–4 a.m. In other words, these are the time periods in which the least amount of business trunk use exists. On the other hand, these same time periods correspond to maximum demand for consumer service from personal phone numbers. Thus, as shown in the consumer or private service section of the transaction allocation database 20 of FIG. 2A, 500 trunks are allocated for calls originating from private consumer terminal devices during the workweek between 8 p.m. and 4 a.m.

With continued reference to FIG. 2A, the customer service section of database 20 shows the opposite use demands and, hence, the opposite trunk allocation for private non-business use during other time periods. As shown, the time period encompassing traditional business hours, i.e. time periods 3–10, typically require that only a minimum amount of trunks be allocated for personal use during weekdays. On the other hand, during the remaining time periods and throughout the weekend, more trunks are allocated for private use as opposed to business use. In the preferred embodiment, software is employed, as is known in the art, by either the signalling network 18 or the international switching station 24 to access the transaction database 22 at regular time intervals, e.g. two-hour intervals, so that dynamic adjustment and re-allocation of the trunks can occur.

As explained above, in the event that a holiday or national event occurs during a weekday wherein many businesses are closed—which will, in effect, also result in a change of consumer demand for services from the demand reflected in the trunk allocation database 20 depicted in FIG. 2A—a substantial volume of the calls placed from personal phone numbers will likely be rejected because of the lack of allocated lines. In other words, based on the information in the trunk allocation database 20 which, as explained above, is gathered during a prior use period such as the two preceding weeks, most of the trunks will still be allocated for business purposes even though the designated volume of business trunks is not required on the holiday when many foreign businesses, which would normally be called from business phones during the particular time of day, are now closed. To alleviate the problem of improper allocation, the present invention includes a global event calendar database 22 connected to and interfaced with international switching station 24 and which contains holiday or event information for a plurality of foreign countries.

FIG. 3 depicts a structural representation of a suitable global event calendar database 22. As there shown, the global event calendar database contains several varieties or categories or fields of information such, for example, as the affected foreign country, the country code, the city code, the holiday or event name, the date that the holiday or event commences and the duration of the holiday or event. The global calendar of FIG. 3 indicates, by way of illustrative example, that the Islamic holiday of Ramadan, which is celebrated throughout most of the Middle Eastern countries, occurs on Mar. 6, 1996 and has a duration of 30 days. In addition, the French national holiday of Bastille Day is indicated as occurring on Jul. 14, 1996 with a duration of 1 day.

As can be expected, the volume of telephone calls from U.S. businesses to France on July 14 will be substantially less than the call volume on a normal, non-holiday workday. However, if insufficient trunk allocation for private service exists on such a holiday, many personal calls will be rejected or not connected because private lines are not available. However, in accordance with the present invention, the global calendar database 22 alters and adjusts the information contained in the trunk allocation database 20 according to particular holiday information. FIG. 3 accordingly includes a re-allocation percentage among, for example, business lines and private lines. For example, during the weekdays of Ramadan, the business line trunks will be reduced by 98%, i.e. from 500 trunks to 10 trunks, during business hours, with a corresponding increase in private line allocation.

Such a re-configuration of the available long distance trunks to a particular country is depicted in FIG. 2B. The modified trunk allocations depicted in FIG. 2B correspond to the dates and times depicted in the corresponding transaction database of FIG. 2A. However, the database of FIG. 2B takes into account holiday information provided by the global calendar database 22. For example, and as explained above, trunk allocation is an ongoing continuing process wherein international switching station 24 continuously interacts at regular intervals with the trunk allocation database 20 to assign a designated number of trunks for a particular service or application. When a holiday or national event for a region or country assigned to a particular international switch 26 occurs, the information pertaining to that particular holiday for that particular region is conveyed by the global event calendar database 22 to the particular long distance international switch 26 through international switching station 24 to re-configure the trunk allocations on the basis of the holiday information.

As an illustrative example, if FIG. 2A depicts the normal trunk allocation between business service and private service for Kuwait for a typical week, then FIG. 2B depicts the trunk allocation for Kuwait during the holiday of Ramadan. As shown in FIG. 2B, since most businesses in Kuwait are, in all likelihood, closed during the weekdays of the Ramadan holiday and as most calls from U.S. business phones to Kuwait are probably to Kuwaiti businesses, most of the business trunks for these time slots have been re-allocated to accommodate personal consumer service as opposed to business service. As will be appreciated, the re-allocation of trunks in this manner enables a higher call completion rate during holiday times because trunk availability is now tailored to fit customer needs based on a holiday schedule that affects a particular region or country.

The software employed by the international switching station 24 to access the trunk allocation database 20 for daily trunk allocation is also used to access the global event calendar database 22. Such access is preferably conducted on a daily basis, however, access at regular, predetermined time intervals may also be implemented. Once accessed, the calendar information corresponding to a particular international switch 26 will be used by the international switching station 24 to dynamically re-configure the trunks allocated to the corresponding international switch 26 for accommodating the anticipated decreased business use and corresponding increased personal customer use from the occurrence of a holiday or event on a weekday in a particular country.

For example, when global event calendar database 22 is accessed on March 6, i.e. Ramadan, international switching station 24 will dynamically re-configure the trunks to override and alter the normal configuration set by the trunk allocation database 20 for the long distance switches providing outgoing communication services to countries that observe Ramadan, i.e. Kuwait, Saudi Arabia, etc. In the event that a particular long distance international switch also provides outgoing communication services to one or more countries that do not observe the same holidays or events, the re-allocation of trunks will be effected on a partial or percentage basis to reflect the relative volume of communication traffic or calls placed through that particular international switch to the various affected countries serviced thereby. The global event calendar database 22 will also provide the duration of the subject holiday to the corresponding switch. That information will, in effect, override the trunk allocation provided by the trunk allocation database 20 for the duration of the particular holiday.

In a preferred embodiment, the global event calendar database 22 is also equipped with an audio message feature to provide a caller with information pertaining to current or upcoming global events that may affect the particular country that the caller is attempting to reach. This information is preferably provided to the caller through the signalling network 18 and the appropriate information is selected from the global calendar database 22 based on the country code or, in some instances, the city or area code forming a portion of the dialed phone number. Such audio information is preferably provided to the caller during the post-dial delay period which exists after a phone number to be reached has been dialed or entered but before the call is connected. The information may be made available for audible replay within a preset time period prior to an up-coming holiday, such as a week before the starting date of the holiday, as well as during the holiday, and the information preferably consists of an identification of the upcoming or existing holiday, its duration, and the starting and ending times. For example, a caller that dials any phone number having a country code corresponding to France or an area or city code corresponding to a domestic area or region having a predominantly French population during the week immediately preceding July 14 (Bastille Day) will be provided with an audio message conveyed to the user by the global event calendar database 22 that a French national holiday occurs on July 14 and will last for one complete day. That information will thereby alert and notify the caller of the holiday, thus allowing the caller to use the information for scheduling changes as well as to remind the caller to call a relative or friend on the day of the holiday or event to convey, among other things, good wishes. The audio message may also consist of long distance rate information for calls placed during the upcoming holiday period.

In the event, for example, that a caller places a call to a foreign business on a national holiday of that business' country, during the post-dial delay period the global event calendar database 22 will provide the caller with an audio message informing the caller of the holiday. This will provide the caller with the opportunity to hang up or otherwise terminate the call before calling charges are incurred, which charges may result where an answering service or recorded message is provided by the called business. In the preferred embodiment, the audio message is provided to the terminal device 12 either directly through the signalling network 18 or through the particular long-distance international switch 26 which is accessed as a function of the country code of the phone number dialed by the user.

The addition of a global event calendar database 22 to a network communication system of the type depicted in FIG. 1 not only provides for dynamic reallocation of available communication trunks based on calendar event and holiday information, but also provides a valuable and useful service in alerting customers of the communication network system of specific up-coming or presently occurring holidays or events which are indigenous to the particular countries called by the user. This allows the callers to use the information in an appropriate manner as described above.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, although separate databases 20 and 22 are shown, these databases may be combined into a single database. In addition, either or both of the databases can, alternatively, be combined with other elements of the communication system such as the long distance exchange 16, the local exchange 14 and/or the signalling network 18. All such alterations, combinations and modifications are intended to be within the scope of the present invention. In addition, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A network communication system providing improved trunk allocation for facilitating an increased call completion rate among a plurality of network customer services, said system comprising:

a switching network having a plurality of trunks for accommodating network traffic, said plurality of trunks connecting transactions between originating terminal devices having originating addresses and destination terminal devices having destination addresses and sharing a common region, each said transaction being associated with one of said plurality of network customer services;

a trunk allocation database connected to said switching network and having memory for storing data representative of a history of transactions between originating terminal devices and destination terminal devices, said history being representative of the network traffic carried by said switching network, said switching network using said history data stored in said memory to allocate said plurality of trunks for accommodating said transactions for said plurality of network customer services in accordance with said history;

a global event calendar database connected to said switching network and having memory for storing data parameters representative of events occurring on particular calendar dates and associated with said common region, said data parameters including event allocation data for use by said switching network for allocating said plurality of trunks for accommodating said transactions for said plurality of network services on an occurrence of each said event; and means for conveying, from said global event calendar database to said switching network, said stored data parameters representative of an event associated with the common region on the particular calendar date associated with the event for dynamically re-configuring the trunk allocation from the allocation in accordance with the history in the trunk allocation database to a revised allocation in accordance with the event allocation data stored in said global event calendar database for accommodating anticipated changes in network traffic through the switching network due to the occurrence of the event on a particular calendar date.

2. The system of claim 1, wherein the stored data parameters further include the name of each said event, the identity of the common region, the duration of each said event and the calendar date on which each said event occurs.

3. The system of claim 2, wherein each transaction commences with an input of a code sequence corresponding to said common region, followed by a delay period, into a select one of said originating terminal devices, and said system further comprising means for accessing said global event calendar database based on said code sequence for providing to said select one original terminal device, within said delay period, said data parameters corresponding to an event associated with said common region.

4. The system of claim 3, wherein the data parameters corresponding to each said event are provided to said originating terminal device within a predetermined time period commencing prior to said event and terminating after said event.

5. The system of claim 1, wherein said trunk allocation database is disposed in communication with said global event calendar database.

6. A network communication system providing improved trunk allocation for facilitating an increased call completion rate among a plurality of network customer services, said system comprising:

a switching network having a plurality of trunks for accommodating network traffic, said plurality of trunks connecting transactions between originating terminal devices having originating addresses and destination terminal devices having destination addresses and sharing a common region, each transaction being associated with one of said plurality of network customer services and each transaction commencing with an input of a code sequence corresponding to said common region into a select one of said originating terminal devices, and wherein a delay period follows the input of said code sequence;

a trunk allocation database connected to said switching network and having memory for storing data representative of a history of transactions between the originating terminal devices and the destination terminal devices, said history being representative of the network traffic carried by said switching network, said switching network using said history data stored in said memory to allocate said plurality of trunks for accommodating said transactions for said plurality of network customer services in accordance with said history data;

a global event calendar database connected to said switching network and having memory for storing data parameters representative of events occurring on particular calendar dates and associated with said common region, said data parameters including event allocation data for use by said switching network for allocating said plurality of trunks for accommodating said transactions for said plurality of network services on an occurrence of each said event;

means for conveying, from said global event calendar database to said switching network, said stored data parameters representative of an event associated with the common region on the particular calendar date associated with the event for dynamically re-configuring the trunk allocation from the allocation in accordance with the history data in the trunk allocation database to a revised allocation in accordance with the event allocation data stored in said global event calendar database for accommodating anticipated changes in network traffic through the switching network due to the occurrence of the event on a particular calendar date; and means for accessing said global event calendar database based on said code sequence for providing to said select one original terminal device, and within said delay period, said data parameters corresponding with the event associated with said common region.

7. The system of claim 6, wherein said data parameters further include the name of each said event, the identity of the common region, the duration of each said event and the calendar date on which each said event occurs.

8. The system of claim 7, wherein the data parameters corresponding to each said event are provided to said originating terminal device within a pre-determined time period commencing prior to said event.

9. The system of claim 8, wherein said trunk allocation database is connected to said global event calendar database.

10. A method for improving trunk allocation for network traffic connected through a switching network having a plurality of trunks associated with a specific global region, each said trunk being assignable to one of a plurality of network customer services in a network communication system for accommodating network traffic for the assigned customer service to increase the rate of call completion, said method comprising the steps of:

storing in a trunk allocation database a history of network traffic including a volume of calls, the network customer service associated with each call in the volume, and the time and day of each call in the volume;

assigning each trunk in said plurality of trunks to one of the plurality of network customer services based on the history of network traffic;

storing, in a global event calendar database, data parameters representative of events occurring on particular calendar dates and associated with said common region, said data parameters including event allocation data for use by said switching network for allocating said plurality of trunks for accommodating transactions for said plurality of network customer services on an occurrence of each said event; and dynamically re-configuring the trunk allocation from the assignment provided in the assignment step to a revised assignment in accordance with the event allocation data stored in said global event calendar database for accommodating anticipated changes in network traffic through the switching network due to the occurrence of the event on a particular calendar date.

11. The method of claim 10, further comprising the steps of accessing said global event calendar database, and providing a network user with at least some of the data parameters representative of one of the events when the network user calls said global region on a date proximate the particular calendar day on which the event occurs.

* * * * *